No. 740,847. PATENTED OCT. 6, 1903.
A. GLEBSATTEL.
DEVICE FOR COOLING PURPOSES.
APPLICATION FILED JULY 8, 1898.
NO MODEL.
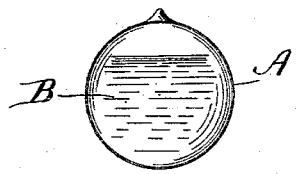

No. 740,847.

Patented October 6, 1903.

UNITED STATES PATENT OFFICE.

AUGUST GLEBSATTEL, OF STEGLITZ, NEAR BERLIN, GERMANY, ASSIGNOR TO PAUL DAMES, OF BERLIN, GERMANY.

DEVICE FOR COOLING PURPOSES.

SPECIFICATION forming part of Letters Patent No. 740,847, dated October 6, 1903.

Application filed July 8, 1898. Serial No. 685,448. (No model.)

*To all whom it may concern:*

Be it known that I, AUGUST GLEBSATTEL, director, a subject of the King of Prussia, Emperor of Germany, residing at Arndtstrasse 1, Steglitz, near Berlin, Prussia, German Empire, have invented certain new and useful Improvements in Devices for Cooling Purposes, of which the following is a full, clear, and exact description.

My present invention, relating to an improved device for cooling drinks, liquids, victuals, or provisions, as well as for technical, medical, and surgical cooling purposes, and the like, consists in the provision of water, brine, or other freezable liquid of such quantity as to allow for freezing expansion within suitably-shaped hollow vessels of glass, porcelain, or other appropriate substance, which vessels are hermetically closed by melting or soldering or other means and submitted from time to time to freezing procedure, so that all such vessels, representing compact ice in premeditated fixed forms or dry ice bodies remaining unruptured and retaining their original shape, can be applied with the highest useful effect for cooling purposes without any consumption of cooling substance nor any operating even when in direct contact upon the objects to be cooled except the reduction of temperature. The smaller vessels should preferably be permanently closed by melting or soldering. The larger bodies may be hermetically sealed by other practical means. All vessels when in use should preferably have all their surfaces free or uncovered by insulating substances in order to produce the most intensive cooling effect in direct contact upon the gaseous fluid or solid objects to be cooled.

In the accompanying drawing I have shown an elevation of a device embodying my invention.

In the drawing, A indicates the body of the device, made of glass, porcelain, or other appropriate substance. In the present instance I have shown the vessel or body as being spherical, though it will be understood that the shape may be varied as desired.

The vessel A may be made of various sizes and before being hermetically closed is charged with water or other freezable liquid, as indicated at B. The quantity of liquid will be such as not to fill the vessel completely, but will leave a space therein to allow of the expansion of the liquid incident to the freezing process. After being charged with the liquid the vessel is hermetically closed and is then ready for use. In using the device for cooling purposes the same is subjected to a freezing temperature, whereby the water will be converted into ice, and by then immersing the device into or in contact with a body of liquid or other substance the same soon becomes cooled. It will be easily understood that these ice vessels will offer great advantages in many respects, as an improved means substituted for the direct addition of broken ice to drinks and liquids, for the distribution of broken ice among other goods to be cooled or kept cool, or substituted for other cooling systems. The ice having no contact with the fresh air or liquids, the cooling process will be uniform and may be easily regulated. The highest useful effect of ice is obtained in every case, as surface and volume of the vessels may easily be combined and varied, owing to the very different particulars of cooling purposes. A large number of small ice vessels require considerably less time and work for freezing in the ice factory than the equal total volume of ice in the usual lumps or blocks, which besides have to be cut or split or sliced, and thus give great inconvenience and loss of material to consumers. The vessels can easily be kept clean and dry and can be conveniently transmitted to consumers in suitably-fitted boxes with insulating-walls, which will keep the ice for a lengthened time.

The most important advantage of the new device will be found in sanitary respects, especially for drinks and the like, which hitherto when cooled by direct addition of broken ice are most dangerously injured by the melting ice carrying bacteria and other impurities. The new ice vessels, which for cooling drinks and the like may be supplied in very small and nice shapes or forms and presented at table in elegant boxes, like sugar-basins, will prevent the aforesaid danger and besides will not dilute nor unpleasantly affect the taste of the drink.

The new device will further prove of great benefit for the transport and storing of milk, wine, beer, as well as generally of all victuals and goods which require to be kept cool, as the ice vessels can be introduced into the liquid without any inconvenience or distributed among the goods and this interior cooling being far more practical and economical than the exterior cooling, which requires much work and very large quantities of ice or special costly and circumstantial cooling systems. Besides, fish, venison, meat, and the like when packed in ice often is frozen and then of inferior quality and market-price, while ice vessels can be applied in such number and shapes just as to produce the cooling to the extent required or desired in each case.

For technical purposes the new device will be advantageously applicable in many cases where a more or less sudden reduction of temperature is required and obtained by direct addition of broken ice, though the liquids or materials to be cooled would preferably be kept entirely free from mixing with the melting ice. The manufacture of margarin, for instance, requires a rapid cooling of the melted fat, so as to prevent the fat from turning granular. For brewers and distillers also the mashing process at a certain stage requires a sudden cooling to prevent, as far as possible, the development of lactic acid. In all these and similar cases the ice vessels of appropriate material conducting heat rapidly and in such forms as to afford the relatively largest surface will grant a well-regulated, rapid, and uniform cooling process without any injuring of the substance to be cooled.

For medical and surgical purposes all the advantages of the new device—viz., the stability of shape or form best applicable, the uniform cooling, the constant dryness, and the hygienic accomplishments—are still more significant and of greater consequences.

What I claim, and desire to secure by Letters Patent, is—

1. A portable permanently and hermetically sealed vessel having therein frozen liquid, the vessel to be submitted from time to time to freezing procedure, retaining its original shape and remaining unruptured and, in use to effect refrigeration, having its operative surface or surfaces free or uncovered by any non-conductive or insulating substance, substantially as described.

2. A portable hermetically-sealed vessel containing frozen liquid, the vessel, to be submitted from time to time to freezing procedure and when in use, having its surface exposed, that is, when in use, to effect refrigeration having its operative surface or surfaces uncovered by non-conductive or insulating substance being unruptured and of practically permanent shape, substantially as described.

3. A hermetically-sealed vessel of heat-conductive substance, containing ice for use as a refrigerant body, substantially as set forth.

In witness whereof I subscribe my signature in presence of two witnesses.

AUGUST GLEBSATTEL.

Witnesses:
HUGO FIEDLER,
C. H. DAY.